(12) United States Patent
Defrancq

(10) Patent No.: US 7,971,906 B2
(45) Date of Patent: Jul. 5, 2011

(54) DEVICE FACILITATING CONTROL OF THE WEIGHTING OF AN AGRICULTURAL TRACTOR AND FOR IMPROVING ITS PRODUCTIVITY

(76) Inventor: Hubert Defrancq, Guignicourt (FR)

( * ) Notice: Subject to any disclaimer, the term of this patent is extended or adjusted under 35 U.S.C. 154(b) by 253 days.

(21) Appl. No.: 12/162,361

(22) PCT Filed: Jan. 23, 2007

(86) PCT No.: PCT/FR2007/000126
§ 371 (c)(1),
(2), (4) Date: Nov. 6, 2008

(87) PCT Pub. No.: WO2007/085722
PCT Pub. Date: Aug. 2, 2007

(65) Prior Publication Data
US 2010/0059976 A1 Mar. 11, 2010

(30) Foreign Application Priority Data
Jan. 27, 2006 (FR) ...................................... 06 00758

(51) Int. Cl.
*A01B 63/02* (2006.01)
(52) U.S. Cl. .......................... 280/759; 172/272; 172/273
(58) Field of Classification Search .................. 280/759, 280/757, 758, 416.1, 416.2, 186; 172/439, 172/443, 444, 272, 273, 6; 414/703
See application file for complete search history.

(56) References Cited

U.S. PATENT DOCUMENTS

| 3,231,294 | A | * | 1/1966 | Horney | 172/272 |
|---|---|---|---|---|---|
| 4,850,789 | A | * | 7/1989 | Zimmerman | 414/703 |
| 5,026,247 | A | * | 6/1991 | Zimmerman | 414/703 |
| 5,069,296 | A | * | 12/1991 | Horsch | 172/825 |
| 5,403,144 | A | * | 4/1995 | Staben, Jr. | 414/697 |
| 5,582,255 | A | * | 12/1996 | Nikkel et al. | 172/6 |
| 5,664,632 | A | * | 9/1997 | Frasier | 172/6 |
| 6,533,319 | B1 | * | 3/2003 | Denby et al. | 280/759 |
| 6,988,560 | B2 | * | 1/2006 | Bay | 172/272 |
| 7,048,070 | B2 | * | 5/2006 | Powell | 172/439 |
| 7,461,702 | B2 | * | 12/2008 | Farnsworth et al. | 172/439 |
| 7,487,843 | B2 | * | 2/2009 | Tuttle et al. | 172/272 |
| 2007/0098538 | A1 | * | 5/2007 | Zettel | 414/723 |
| 2007/0261866 | A1 | | 11/2007 | Defrancq | |
| 2010/0059976 | A1 | * | 3/2010 | Defrancq | 280/759 |

FOREIGN PATENT DOCUMENTS

| FR | 2 815 319 A | 4/2002 |
|---|---|---|
| FR | 2 864 818 A1 | 7/2005 |
| WO | 02/21898 A | 3/2002 |

\* cited by examiner

*Primary Examiner* — Paul N Dickson
*Assistant Examiner* — Karen A Beck
(74) *Attorney, Agent, or Firm* — Young & Thompson

(57) ABSTRACT

Device for facilitating the control of the weighting of an agricultural tractor and for improving its productivity, includes a support member (A) designed to run transversely to the direction of travel of the tractor, this support member having a central part with a member (B) for coupling to a front or rear three-point lift of the tractor and, on each side of this central part, a lateral extension (Aa, Ab) equipped with a unit of attachment (Ea, Eb) of a weight, a load or a tool.

13 Claims, 6 Drawing Sheets

DEVICE FACILITATING CONTROL OF THE WEIGHTING OF AN AGRICULTURAL TRACTOR AND FOR IMPROVING ITS PRODUCTIVITY

The invention relates to a device for making it easier to manage the ballasting of an agricultural tractor and for improving its productivity.

The capacity of a tractor to transmit a force to the ground is determined by the coefficient of adhesion of this tractor to the ground. This coefficient, which corresponds to the ratio of the traction force over the weight of the tractor, is variable according to the ground conditions and the elements for connecting the tractor to the ground, tires or tracks.

The possible traction force is equal to the coefficient of adhesion multiplied by the weight supported by the elements that transmit the traction torque.

The weight supported by the driving elements of the tractor, drive wheels or tracks, is therefore a factor on which the user may act in order to improve the traction capacity, for a given coefficient of adhesion. It is therefore known practice to ballast the tractor for example by means of weights installed in the wheels, or by inflating the tractor wheels with water.

However, the added weight is a generator of rolling resistance, of ground compaction and of premature wear through added fatigue of the mechanical components.

It is therefore desirable to be able easily to add or remove the excess weight, in order to quickly adapt to the working conditions.

At the front of the tractor, this management is relatively easy with the aid of a front hitch, as shown for example in patent applications FR 2 864 818 or FR 2 814 038.

At the rear, an implement is often coupled to the tractor for the application that justifies the use of the tractor. In this case, the direct coupling of a weight in the rear hitch is a source of interference with the implement used, even though it is only a trailed implement. In addition, the presence of the weight in the rear hitch limits visibility on the rear implement.

The primary object of the invention is to provide a device making it possible to make the management of the ballasting of an agricultural tractor easier and to improve its productivity, by making it easier to fit and remove ballast weights without using tools for securing them to the tractor.

It is also desirable for the proposed device to allow the use of an implement at the rear of the tractor, without limiting the rear central visibility and allowing hydraulic supply hoses of the implements to pass without interference.

When it is installed at the front, preferably, the device should make it possible to reduce the longitudinal overhang in the frontal position of the weights and to eliminate interference with the lighting system.

More generally, the device should make it possible to increase the overall productivity by making it possible to increase the number of ballast weights or working implements that can be fitted to the tractor.

According to the invention, a device for making it easier to manage the ballasting of an agricultural tractor and for improving its productivity is characterized in that it comprises a support means designed to extend transversely to the direction of travel of the tractor, this support means comprising a central portion with a means for coupling to a three-point hitch, front or rear, of the tractor and, on either side of this central portion, a side extension fitted with a means for coupling a weight, a load or an implement.

Advantageously, the coupling means of each side extension is a standard three-point means for coupling with the coupling triangle of an agricultural implement or a weight.

The coupling means of the side extensions may comprise lower coupling points furnished with foldable latches suitable for holding the weights or the implements hitched to these coupling points.

The support means may comprise a cross beam fixedly attached to vertical arms extending downward and spaced apart in the longitudinal direction of the beam, the coupling means of the three-point side extensions comprising two hooks provided at the bottom with two arms and a top hook fixedly attached to the beam.

Advantageously, the spacing between the inner arms corresponds to the standard spacing of the lower coupling points of an implement and the lower points for coupling to the tractor hitch are attached at the bottom end of the arms on the side turned toward the tractor.

When the device is designed to be coupled to a front hitch of a tractor, it may comprise coupling means turned toward the front and toward the rear on the side extensions in order to make it possible to couple two weights on either side, one in front of and the other behind the support means.

The support means may be formed by a frame comprising two side extensions offset toward the tractor so as to reduce the overhang of the weights hitched to these side extensions.

The device may comprise side extensions supported by lifting means connected to a central portion of the support means so as to lift the weights in order to allow a drawbar of a semi-mounted implement to pass beneath these weights.

The lifting means may comprise at least one cylinder placed transversely in order to control the raising or lowering of the side extensions connected to a central frame by at least one articulated arm.

When the lifting means comprise a single cylinder placed transversely in order to control the raising or lowering of the side extensions, top stops and bottom stops are provided in order to prevent a weight from going beyond the ends of its trajectory, The lifting means may comprise two cylinders, one per arm, placed transversely.

Each side extension may be connected to the central portion by a deformable parallelogram.

Apart from the arrangements explained above, the invention consists in a certain number of other arrangements that will be dealt with more explicitly below concerning exemplary embodiments described with reference to the appended drawings, but which are in no way limiting. In these drawings.

Figure 1:
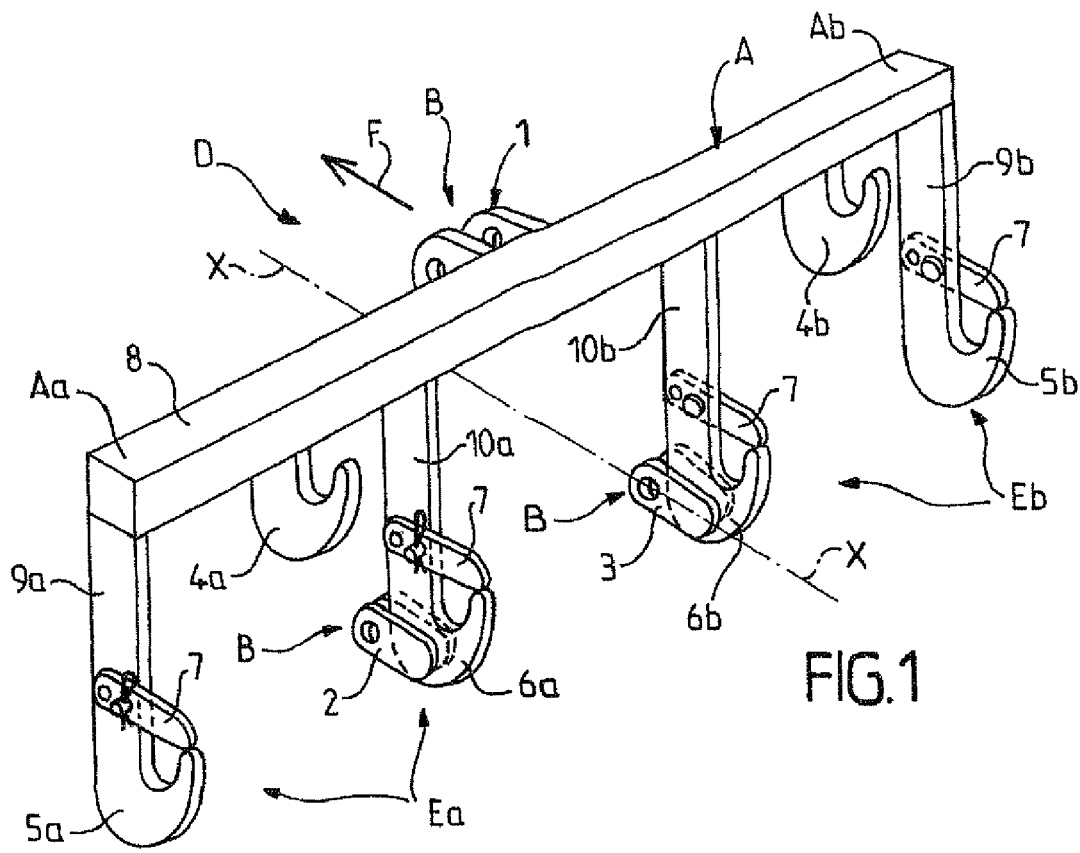
FIG. 1 is a view in perspective of a device according to the invention to make the management of the ballasting of an agricultural tractor easier.

With reference to FIG. 1, it is possible to see a device D according to the invention for making it easier to manage the ballasting of an agricultural tractor, and for improving its productivity. The device D comprises a support means A designed to extend transversely, essentially at right angles, to the direction of travel X-X of the tractor. This support means A comprises, in its central portion, a means B for coupling to a three-point hitch, front or rear, of the tractor. Note that a tractor three-point hitch comprises two lower attachment points provided at the end of arms b2, b3 (FIG. 2) controlled by lifting means and a third top point, equidistant from the lower coupling points, usually connected by a connecting rod b1 (FIG. 2) to the third coupling point of the implement.

The coupling means B of the central portion comprises three connection elements, namely a top middle element 1 and two bottom side elements 2, 3. These connection elements may be made in the form of clevises comprising two lugs spaced apart, pierced with holes, between which eyes c1, c2, c3 (FIG. 2) provided at the end of the tractor lift arms are housed. The connection between the clevises and the eyes is made by a spindle passing through the clevis and the associated eye.

The support means A has, on either side of its central portion with coupling means B, a side extension Aa, Ab fitted respectively with side coupling means Ea, Eb allowing weights, loads or implements to be coupled and to be easily uncoupled without the user needing a tool for these operations.

Advantageously, each side coupling means Ea, Eb is of the standard three-point hitch type 4a, 5a, 6a and 4b, 5b and 6b with the coupling triangle of an agricultural implement or a weight. Each means Ea, Eb makes it possible to attach a ballast weight, or an implement normally connected to the tractor three-point hitch. The ballast weight or the implement coupled to the means Ea, Eb is rapidly fitted and removed without tools. As explained in the rest of the description, the loads likely to be coupled to the means Ea, Eb may consist of tanks filled with liquid or of pallet forks for example.

The top coupling points 4a, 4b are formed by hooks equidistant from the associated lower coupling points 5a, 6a or 5b, 6b.

The coupling means Ea, Eb are turned on the side of the support means A opposite to the coupling means B.

The dimensions of the side extensions Aa, Ab are standardized at their interface with the coupling triangle of the implement or of the weight to make interchangeability easier.

The lower coupling elements 5a, 6a and 5b, 6b are fitted with foldable latches 7 in order to hold the weights or the hitched implements in the lower hooks 5a, 6a or 5b, 6b.

Figure 2:
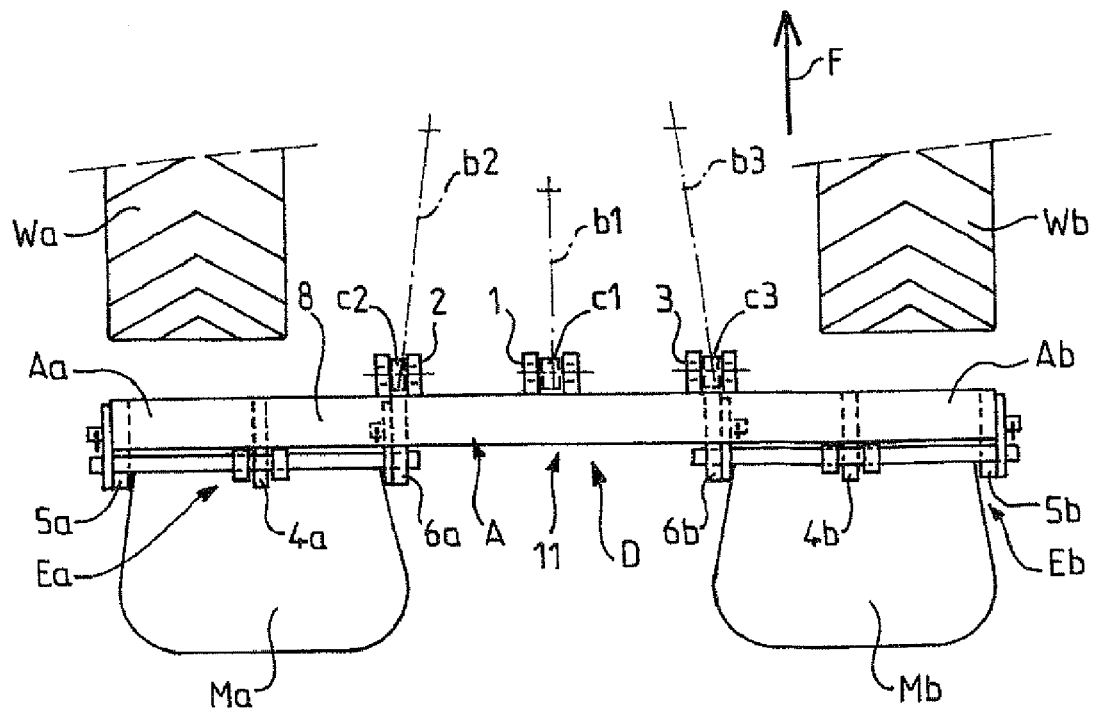
FIG. 2 is a schematic top view of the device of FIG. 1 hitched to the rear of a tractor.

According to the exemplary embodiment of FIGS. 1 and 2, the support means A comprises a frame 8 formed by a cross beam fixedly attached to vertical arms 9a, 10a and 9b, 10b extending downward and spaced apart in the longitudinal direction of the frame 8. The lower coupling elements 5a, 6a and 5b, 6b are provided at the bottom end with the vertical arms.

Advantageously, the spacing between the inner arms 10a and 10b corresponds to the standard spacing of the lower coupling points of an implement so that the clevises 2 and 3 are attached at the bottom end of the arms 10a, 10b on the side opposite to the coupling elements 6a, 6b.

FIG. 2 shows, in a top view, the device D hitched to the rear of a tractor behind the wheels Wa, Wb. The rear hitch of the tractor is schematically represented with the connecting rod b1 of the third top point, and the lower arms b2, b3. The direction of movement of the tractor is shown schematically by the arrow F.

A weight Ma, Mb is shown attached to the side coupling means Ea, Eb. An implement could be coupled instead of one or other of the weights.

Note that the central zone 11 between the coupling means Ea, Eb remains free, which allows the user to retain good visibility rearward, because the weights are then placed behind the right and left tires, that is to say in a zone where visibility is already limited.

The free central zone 11 at the rear allows the coupling of an implement to the tractor's towing system which may consist of a hook or a drawbar.

The transverse dimension of the frame 8 is usually less than or equal to the maximum transverse space requirement of the tractor, whose overall width is not therefore increased.

Figure 3:
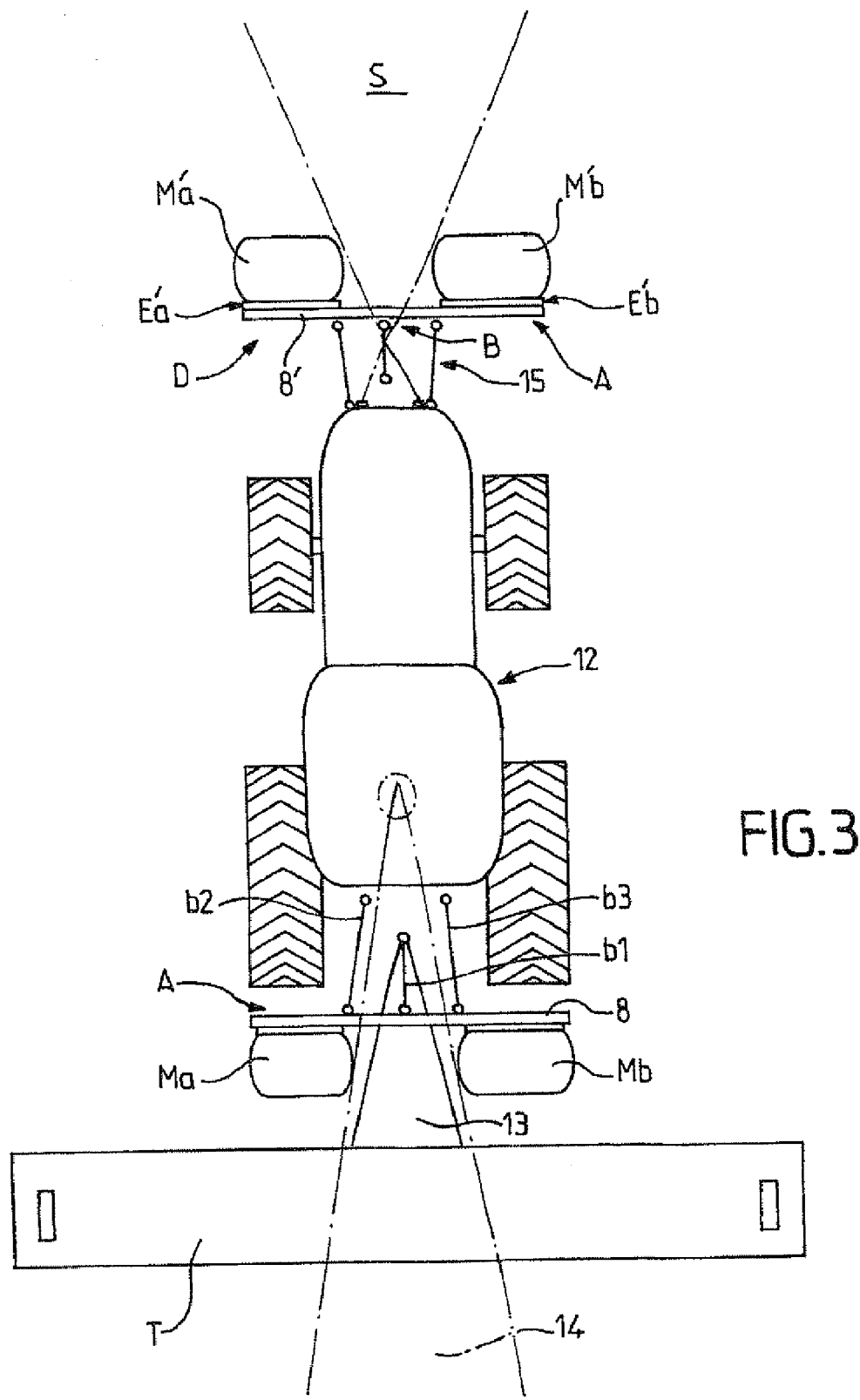
FIG. 3 is a schematic top view of a tractor fitted with a device according to the invention both at the front and at the rear.

FIG. 3 shows, in a top view, a tractor 12 comprising at the rear a frame 8 coupled to the tractor's rear hitch with two weights Ma, Mb coupled to the side extensions of the frame 8, to the rear relative to the tractor. A trailed implement T is hitched to the tractor's rear hook by a rigid traction element 13. The rearward field of view 14 of the driver is clear in the central portion.

Another frame 8' is hitched to the front hitch device 15 of the tractor with its central coupling means B turned toward the rear, that is to say toward the tractor and the side coupling means E'a, E'b turned toward the front. The weights M'a, M'b are coupled toward the front relative to the frame 8' while leaving the central portion free.

When a frame 8' is mounted onto a front hitch device of the tractor, as illustrated in FIG. 3, the side overhang of the weights M'a, M'b or of the implements or tanks coupled to the frame 8' makes it possible to avoid obstructing the beam S of the headlights.

Figure 4:
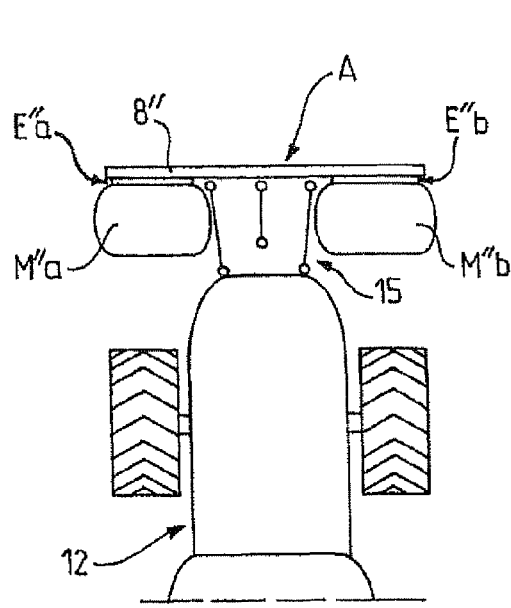
FIG. 4 shows partially, in a top view, an equipment variant of the tractor at the front.

FIG. 4 shows a variant embodiment according to which the frame 8" coupled to the front hitch of the tractor comprises side coupling means E"a, E"b turned toward the tractor so that the ballast elements, particularly the weights M"a, M"b that are coupled, are turned toward the tractor relative to the frame 8". The longitudinal overhang of the weights M"a, M"b, relative to the tractor, is therefore reduced relative to the solution of FIG. 3.

Figure 5:
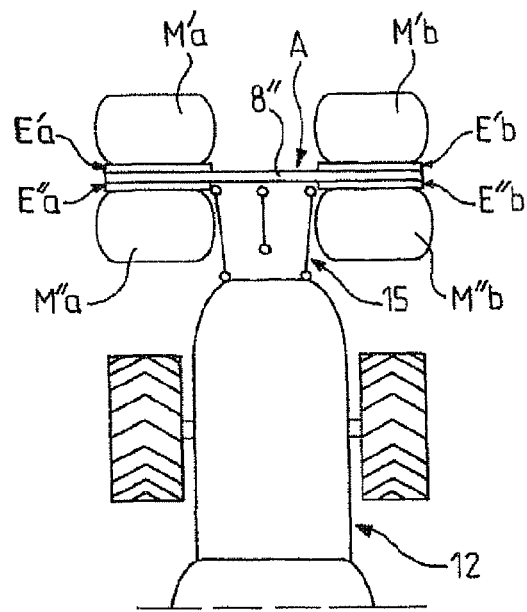
FIG. 5 shows, similarly to FIG. 4, another equipment variant of the tractor at the front.

FIG. 5 shows, similarly to FIG. 4, another variant embodiment according to which the frame 8" situated at the front of the tractor comprises, on its side extensions, a dual coupling means, that is to say on the left a coupling means E'a turned toward the front and a coupling means E'"a turned toward the rear and, on the right, a coupling means E'b turned toward the front and a coupling means E'"b turned toward the rear, all these coupling means being of the standard three-point type.

It therefore becomes possible to increase the ballast capacity with four weights, respectively M'a, M"a and M'b, M"b. These weights may be standard weights that are not very costly to produce and simple to handle. When these weights consist of tanks filled with liquid, particularly water, each tank is mounted on a cradle furnished with a standard three-point coupling.

Figure 6:
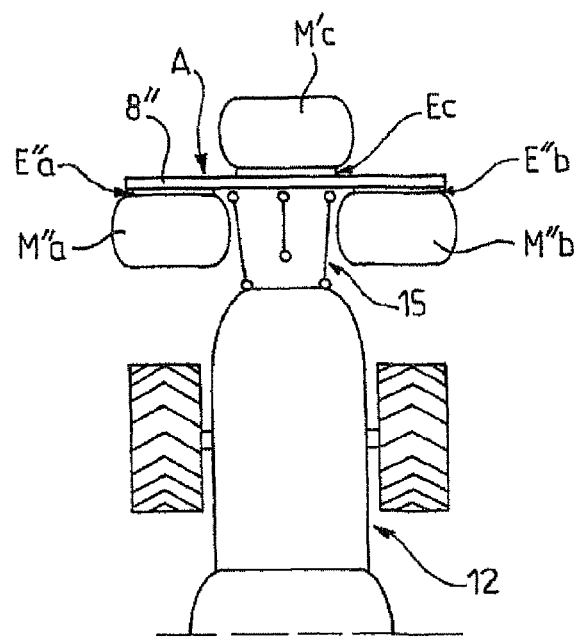
FIG. 6 shows, in a top view, another equipment variant of the tractor at the front.

FIG. 6 shows, similarly to FIG. 4, another variant embodiment according to which the frame 8" situated at the front of the tractor comprises, on the front side, a central coupling means Ec with standard three points in addition to the coupling means E"a and E"b provided toward the rear on the side extensions. Three weights or loads may therefore be hitched to the frame 8", namely two side weights M"a, M"b turned toward the rear and a central weight M'c turned toward the front.

Figure 7:
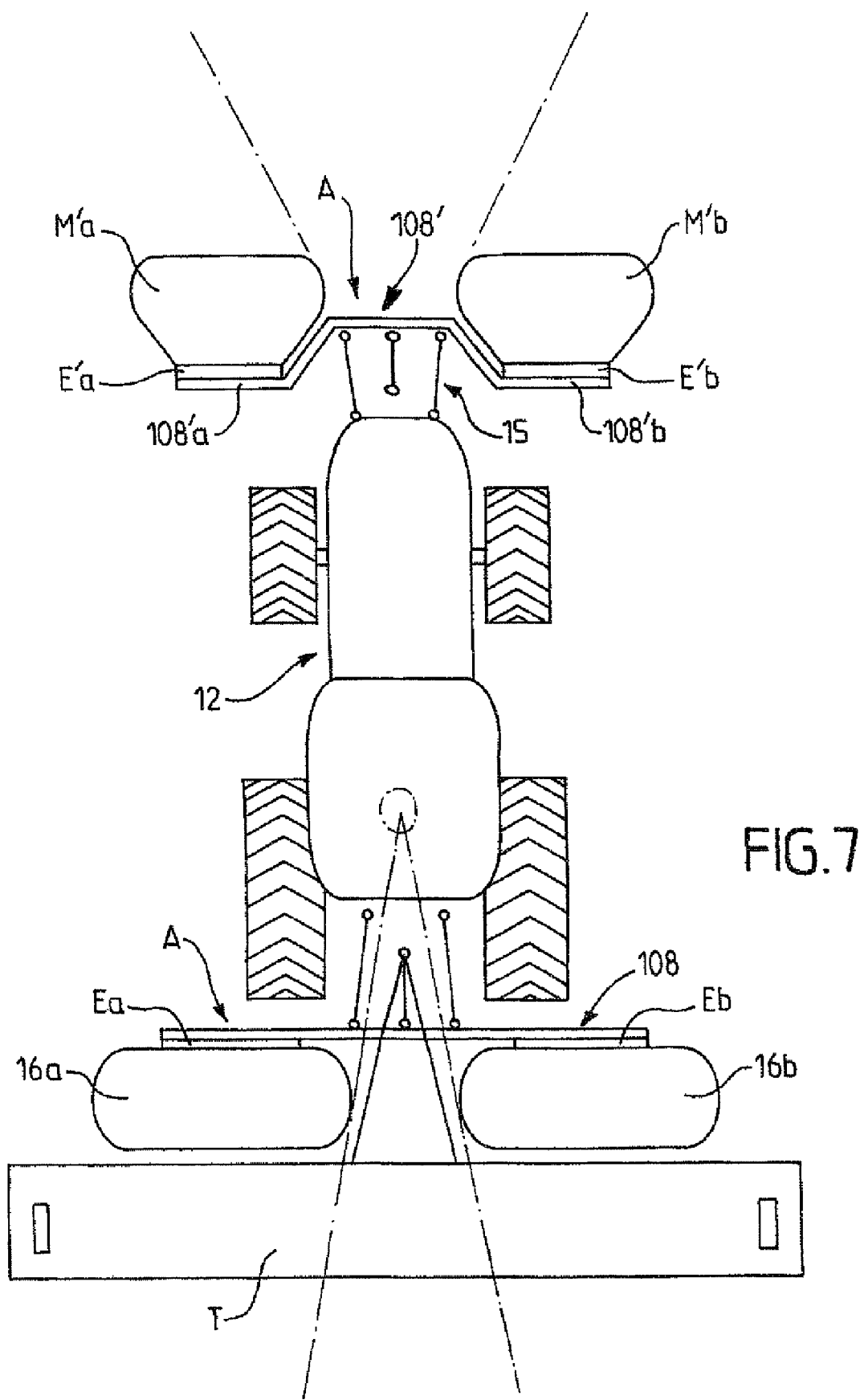
FIGS. 7 and 8 show, similarly to FIG. 3, two other equipment variants of the tractor.

FIG. 7 shows, similarly to FIG. 3, a variant embodiment according to which the frame 108' coupled to the front hitch of the tractor comprises two side extensions 108'a, 108'b offset toward the rear, that is to say toward the tractor. The longitudinal overhang of the weights M'a, M'b coupled at the front of the extensions 108'a, 108'b on the attachment means E'a and E'b is therefore limited. Seen from above, the frame 108' comprises a central portion formed by the small base of an isosceles trapezium, situated toward the front, while the side extensions 108'a, 108'b situated toward the rear are connected by the inclined sides of the trapezium to the small base.

It should be noted that, according to FIG. 7, the frame 108' has a transverse dimension greater than the widthwise space requirement of the tractor in order to make it possible to attach more voluminous loads.

In the same manner, the rear frame 108 according to FIG. 7 has a transverse dimension greater than the width of the tractor, which allows an increase in the spacing of the side extensions and the installation of tanks 16a, 16b that are more voluminous, for example filled with water. Each tank is attached to a cradle (not visible) comprising three standard coupling points for hitching to the side coupling means Ea, Eb.

Figure 8:
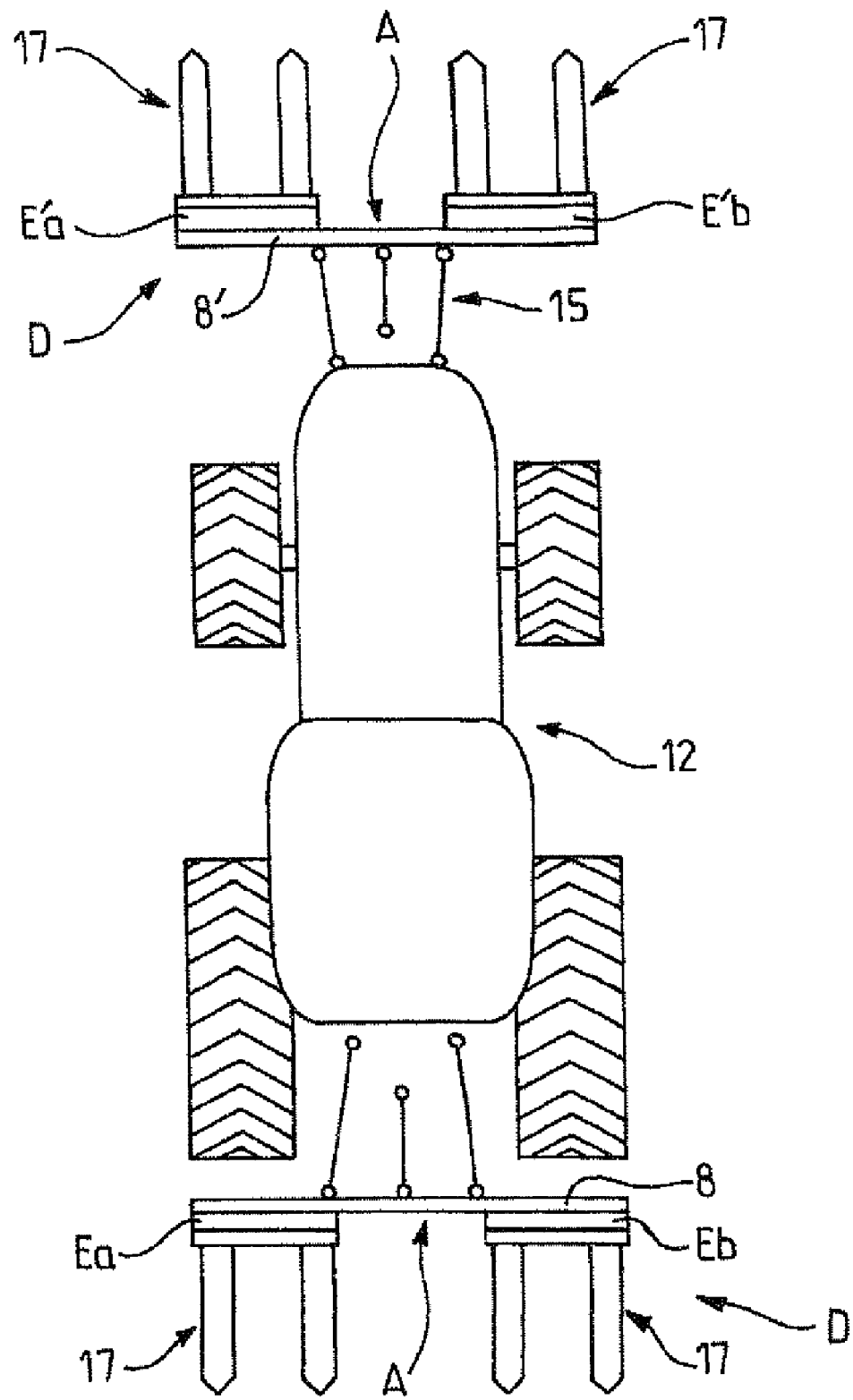

FIG. 8 shows, similarly to FIG. 3, an equipment variant of the tractor 12 according to which the rear frame 8 and the front frame 8', coupled respectively to the rear hitch and the front hitch, are fitted on their side extensions with forks 17 for handling pallets. Two forks 17 oriented toward the rear are coupled by three points to the side coupling means Ea, Eb of the rear frame 8. Two forks 17 oriented toward the front are coupled by three points to the side coupling means E'a and E'b of the front frame 8'.

The tractor is therefore fitted with four forks for the handling of pallets which substantially increases its productivity. Fitting and removing these forks 17 is very rapid thanks to the standard three-point coupling means.

Implements other than pallet forks 17 may be coupled to the frames 8, 8', for example bale spikes.

The device D has high versatility.

Figure 9:
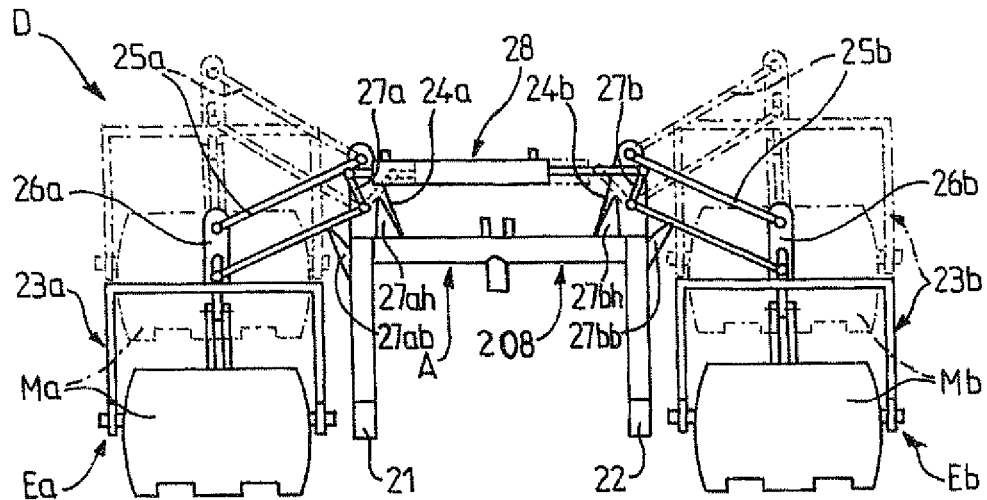
FIG. 9 is a schematic view in elevation of a variant embodiment of the device according to the invention.

FIG. 9 shows, in elevation, a variant embodiment of the device D designed to be mounted at the rear of a tractor and to be combined with semi-mounted implements. In this case, the two low points of the central coupling means are used to couple a support 18 (FIG. 10) furnished toward the rear with a plate 19 for a pivoting connection, about a vertical axis, of an implement drawbar 20.

The device D comprises a frame 208 formed by an inverted U-frame furnished, on the side turned toward the tractor, with the means B for coupling to the tractor's three-point hitch and, on the opposite side, with lower side hooks 21, 22 to allow the coupling of an implement.

A side extension 23a, 23b is installed on each side of the frame 208. Each side extension 23a, 23b comprises three coupling points in a triangle so that the weight, or the load, coupled to the side extension is held without the possibility of tilting relative to this extension.

The side extensions 23a, 23b may be made in the form of inverted U-frames.

According to the embodiment of FIG. 9, each side extension 23a, 23b is connected to a vertical side protrusion 24a, 24b of the frame 208 by a deformable parallelogram 25a, 25b. The large sides of this parallelogram are articulated at their ends on the one hand on the protrusions 24a, 24b and, on the other hand, on vertical lugs 26a, 26b provided on a top crossmember halfway across the frames 23a, 23b.

The end of the large lower side of each parallelogram articulated on the protrusion 24a, 24b is fixedly attached to an upward extension 27a, 27b substantially at a right angle.

At least one hydraulic cylinder 28 placed transversely, parallel to the upper side of the frame 208, is connected in an articulated manner, respectively via its cylinder and via the end of its rod, to the extensions 27a, 27b at a distance from the articulation point of the large lower side.

When a single cylinder 28 is provided between the two extensions 27a, 27b, for a simultaneous action, a top stop 27ah, 27bh and a bottom stop 27ab, 27bb are provided fixedly attached to the frame 208. These stops make it possible to prevent a weight from going beyond the ends of its trajectory, otherwise the relative symmetrical position of the side weights or loads relative to the frame is not ensured.

This constraint is removed when two cylinders 28, one per arm, are provided, which is more costly. However, the technical result is similar.

In the bottom position of the frames 23a, 23b, illustrated by solid lines in FIG. 9, the weights Ma, Mb may rest on the ground, the rod of the cylinder 28 being extended and the parallelograms 25a, 25b having their large sides directed downward.

By supplying the cylinder 28 with pressurized oil in order to retract the cylinder rod into the cylinder, the user causes the top ends of the extensions 27a, 27b to move closer together and the parallelograms 25a, 25b to deform in the upward direction as far as a position represented in dashed lines in FIG. 9. During this movement, the frames 23a, 23b and the weights Ma, Mb move parallel to one another.

Figure 11:
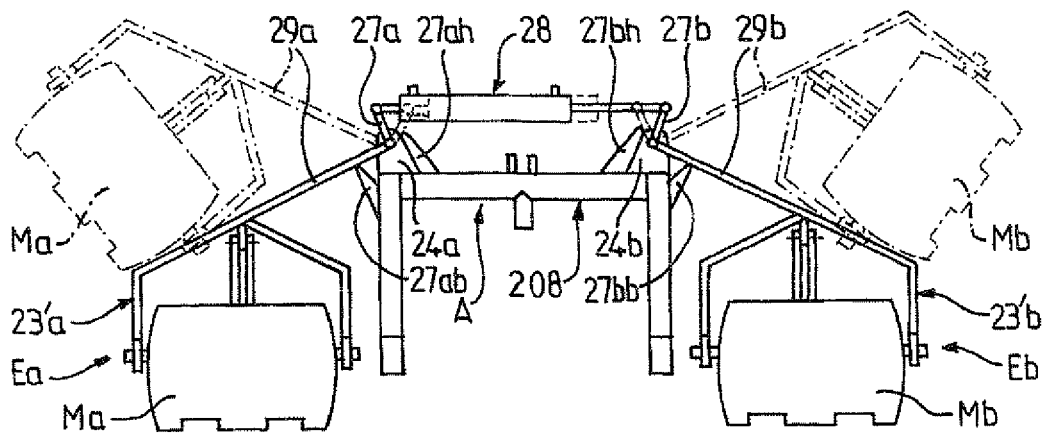
FIG. 11 is a schematic view in elevation of another variant embodiment of the device.

FIG. 11 shows a variant embodiment of the device of FIG. 9 according to which each side extension 23'a, 23'b, instead of being connected by a deformable parallelogram to the frame 208, is connected by an arm 29a, 29b whose end articulated on the protrusions 24a, 24b is fixedly attached to the extension at a right angle 27a, 27b. The cylinder 28 is articulated on the top ends of the extensions 27a, 27b.

With this arrangement, when the side extensions 23'a, 23'b move from the bottom position illustrated in solid lines to the top position illustrated in dashed lines, the weights Ma, Mb change orientation and no longer remain parallel with one another.

Figure 10:
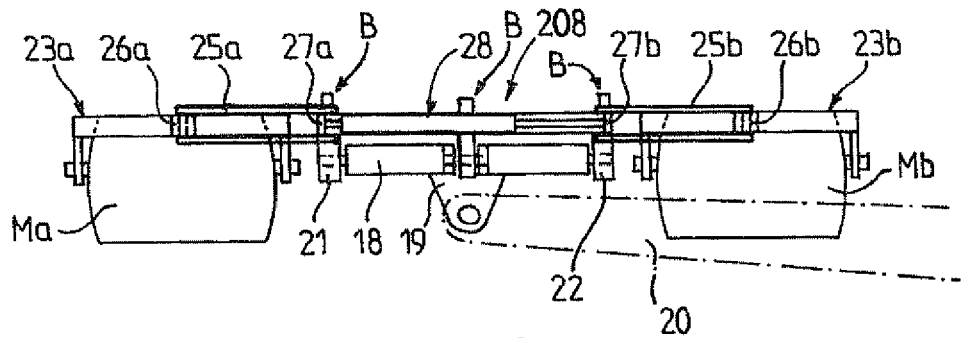
FIG. 10 is a top view relative to FIG. 9.

The device of FIGS. 9 to 11 makes it possible to ensure that the weights Ma, Mb placed on the ground are easy to couple or uncouple.

The coupled weights Ma, Mb may be lifted with the aid of the cylinder(s) 28 which makes it possible to prevent any risk of interference between the drawbar 20 of an implement hitched to the tractor during maneuvers.

The top view according to FIG. 10 illustrates the gain in maneuverability obtained by allowing the drawbar 20 of the semi-mounted implement to pass beneath a side weight.

The invention claimed is:

1. A device for managing ballasting of an agricultural tractor and for improving its productivity, comprising:
    a support means (A) extending transversely to the direction of travel of the tractor,
    wherein the support means (A) comprises a central portion with a first means (B) for coupling to a three-point hitch, front or rear, of the tractor, said first means (B) for coupling comprising three connection elements in said central portion, namely a top middle element (1) and two bottom side elements (2, 3),
    extending beyond both sides of said central portion, side extensions (Aa, Ab; 23a, 23b; 23'a, 23'b) fitted with second means (Ea, Eb; E'a, E'b; E"a, E"b) for coupling a weight, a load or an implement, and
    another coupling means turned toward the front (E'a, E'b) and toward the rear (E"a, E"b) on the side extensions for coupling weights on both sides, one in front of and the other behind the support means (A).

2. A device for managing ballasting of an agricultural tractor and for improving its productivity, comprising:
- a support means (A) for extending transversely to the direction of travel of the tractor,
- wherein the support means (A) comprises a central portion with a first means (B) for coupling to a three-point hitch, front or rear, of the tractor,
- said first means(B) for coupling comprising three connection elements, namely a top middle element (1) and two bottom side elements (2, 3) and, on both sides of this central portion, side extensions (Aa, Ab; 23a, 23b; 23'a, 23'b) fitted with three-point coupling means for coupling with a coupling triangle of an agricultural implement or a weight.

3. The device as claimed in claim 1, wherein said second coupling means comprise lower coupling points (5a, 6a; 5b, 6b) with foldable latches (7) holding the weights or the implements hitched to these coupling points.

4. The device as claimed in claim 1, wherein said support means (A) comprises a cross beam (8, 8'; 108; 108') fixedly attached to vertical arms (9a, 10a; 9b, 10b) extending downward and spaced apart in the longitudinal direction of the beam, the second coupling means comprising two hooks (5a, 6a; 5b, 6b) provided at the bottom with two arms and a top hook (4a, 4b) fixedly attached to the beam.

5. The device as claimed in claim 4, wherein spacing between inner ones of the vertical arms (10a, 10b) corresponds to a spacing of lower coupling points of an implement and wherein said bottom side elements (2, 3) for coupling to the tractor hitch are attached at the bottom end of the inner arms (10a, 10b) on the side turned toward the tractor.

6. The device as claimed in claim 1, wherein said support means (A) is a frame (108') comprising two side extensions offset toward the tractor (108'a, 108'b) so as to reduce the overhang of weights (M'a, M'b) hitched to these side extensions.

7. A device for managing ballasting of an agricultural tractor and for improving its productivity, comprising:
- a support means (A) for extending transversely to the direction of travel of the tractor,
- wherein the support means (A) comprises a central portion with a first means (B) for coupling to a three-point hitch, front or rear, of the tractor,
- said first means(B) for coupling comprising three connection elements, namely a top middle element (1) and two bottom side elements (2, 3) and, on both sides of this central portion, side extensions (Aa, Ab; 23a, 23b; 23'a, 23'b) fitted with second means for coupling to weights,
- wherein said side extensions (23a, 23b; 23'a, 23'b) are supported by lifting means (25a, 25b; 29a, 29b; 28) connected to a central portion (208) of the support means so as to lift the weights in order to allow a drawbar (20) of a semi-mounted implement to pass beneath these weights,
- wherein said lifting means comprise at least one cylinder (28) placed transversely in order to control the raising or lowering of the side extensions (23a, 23b; 23'a, 23'b) connected to a central frame (208) by at least one articulated arm (25a, 25b; 29a, 29b), and
- wherein each said side extension (23a, 23b) is connected to the central portion (208) by a deformable parallelogram (25a, 25b).

8. The device as claimed in claim 7, wherein said lifting means comprise a single cylinder (28) placed transversely in order to control the raising or lowering of the side extensions (23a, 23b; 23'a, 23'b) and top stops (27ah, 27bh) and bottom stops (27ab, 27bb) that prevent a respective one of the weights from going beyond the ends of its trajectory.

9. The device as claimed in claim 7, wherein said lifting means comprise two cylinders, one per arm, placed transversely.

10. The device as claimed in claim 2, wherein said three-point coupling means comprise lower coupling points (5a, 6a; 5b, 6b) furnished with foldable latches (7) suitable for holding the weights or the implements hitched to these coupling points.

11. The device as claimed in claim 2, wherein said support means (A) comprises a cross beam (8, 8'; 108; 108') fixedly attached to vertical arms (9a, 10a; 9b, 10b) extending downward and spaced apart in the longitudinal direction of the beam, said three-point coupling means comprising two hooks (5a, 6a; 5b, 6b) provided at the bottom with two arms and a top hook (4a, 4b) fixedly attached to the beam.

12. The device as claimed in claim 2 for being coupled to a front hitch of a tractor, further comprising further coupling means turned toward the front (E'a, E'b) and toward the rear (E"a, E"b) on the side extensions in order to make it possible to couple two weights (M'a, M"a; M'b, M"b) on either side, one in front of and the other behind the support means (A).

13. The device as claimed in claim 2, wherein said three-point coupling means are coupled to weights and said side extensions (23a, 23b; 23'a, 23'b) are supported by lifting means (25a, 25b; 29a, 29b; 28) connected to said central portion (208) of the support means so as to lift the weights in order to allow a drawbar (20) of a semi-mounted implement to pass beneath these weights.

* * * * *